Sept. 27, 1966 K. ALMSTRÖM 3,275,838
EQUIPMENT FOR REGULATING TRANSMITTED POWER BETWEEN
TWO ASYNCHRONOUSLY CONNECTED ELECTRIC
ALTERNATING CURRENT GRIDS
Filed April 2, 1963
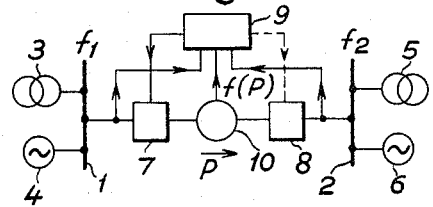
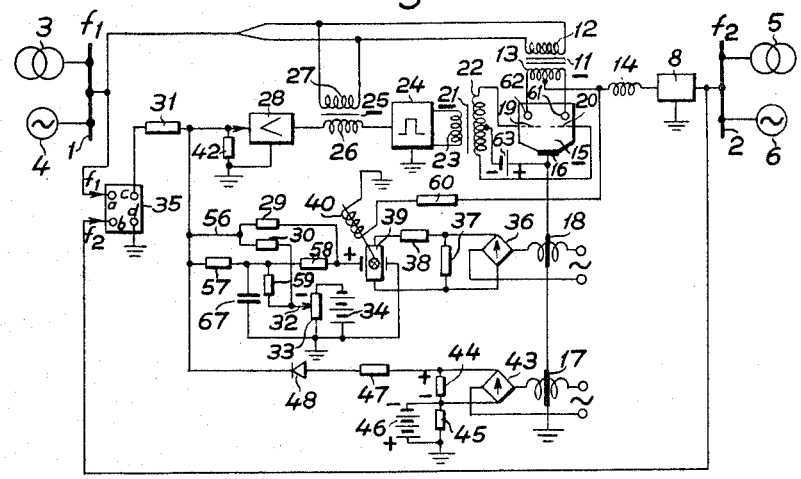
INVENTOR.
KNUT ALMSTRÖM
BY
Bailey, Stephens & Huetig
ATTORNEYS

United States Patent Office 3,275,838
Patented Sept. 27, 1966

3,275,838
EQUIPMENT FOR REGULATING TRANSMITTED POWER BETWEEN TWO ASYNCHRONOUSLY CONNECTED ELECTRIC ALTERNATING CURRENT GRIDS
Knut Almström, Vasteras, Sweden, assignor to Allmanna Svenska Elektriska Aktiebolaget, Vasteras, Sweden, a Swedish corporation
Filed Apr. 2, 1963, Ser. No. 270,075
Claims priority, application Sweden, Apr. 3, 1962, 3,673/62
4 Claims. (Cl. 307—82)

The present invention relates to equipment for regulating the transmitted power between two electric alternating current grids each containing load objects and power generators determining the frequency of the grid, which grids are connected together via a link which permits the frequencies of the grids to be freely varied in relation to each other (asynchronous operation). The link contains one converter connected to one grid and one to the other. One type of asynchronous connection of two alternating current grids which can be regulated by equipment according to the invention is a direct current link consisting of a rectifier connected to one grid and a converter connected to the other grid. The rectifier and converter may be situated fairly far from each other, in which case they are connected together by means of cables or air conductors. The two converters may also be situated in the same place, however, in which case the connection between the converters will be very short. Common to both the above mentioned arrangements is that a direct current link exists between the two converters. Regulating equipment according to the invention, however, is not limited for use with converters having a direct current link therebetween, but other connection elements may be used which permit an asynchronous connection of two alternating current grids. For the sake of simplicity, however, the invention will be described with reference to asynchronous connection of grids via direct current links.

As already mentioned, the invention relates to asynchronously connected alternating current grids, i.e. a connection which permits the frequencies of the grids to freely vary in relation to each other, contrary to synchronous operation where the angle deviation may not exceed about 90° without synchronism being lost. The invention may be used for regulating transmitted power between two grids having substantially the same frequency, for example 50 Hz., or two grids having different frequencies, for example one having 50 Hz. and one having 60 Hz.

Equipment according to the invention for regulating transmitted power between two electric alternating grids each containing load objects and power generators determining the frequency of the grid, which grids are connected together via a link permitting the frequencies of the grids to be freely varied in relation to each other (asynchronous operation), and which link contains one converter connected to one grid and one connected to the other grid, is characterised in that at least one of the converters is provided with a regulator which influences the transmitted power of the converter and thus that of the link, this regulator being under the influence of a signal which is a time operand of the relative difference in frquency between the two grids. By the relative difference in frequency between two grids having the actual frequencies $f_1$ and $f_2$ and the nominal frequencies $f_{10}$ and $f_{20}$ is meant $$\frac{f_1}{f_{10}} - \frac{f_2}{f_{20}}$$

According to a further development of the invention, the regulator may also be under the influence of a second signal which is a time operand of the transmitted power. By a time operand is here meant either the quantity itself, its integral value, its derivative or any quantity derived by means of a time operator.

It is known to regulate asynchronous links on constant power or on constant frequency in either of the two grids between which the asynchronous link is connected. When regulating on constant power the same power will be transmitted irrespective of load variations which might occur in the two grids. The grids are thus not in a position to assist each other in compensating large load alterations. When regulating on constant frequency in one or other of the grids the transmitting link may be given a certain regulating static so that the power transmission will be dependent upon the frequency of one of the grids.

The advantage with these known asynchronous links in comparison with synchronous transmission is that in the asynchronous links a very simple limitation of the transmitted power can be provided so that the link is not over-loaded. Another advantage is that the transmitted power can easily be increased to a maximum desired value. This is not the case with synchronous transmission links where no power limitation preventing overloading of the link can be obtained, except by completely disconnecting the link. Synchronous transmissions, however, have the advantage as compared to the known asynchronous transmission links, that they permit a varying power exchange between the two connected grids so that power variations are regulated out by the two grids in assistance.

The invention combines the advantages of the two known systems, i.e. the asynchronous links and the synchronous transmission links, so that a limitation of the transmission power is extremely easily obtained at the same time as power variations are superimposed on both grids. Besides this, according to a further development of the invention, a desired average power transmission in either direction can easily be obtained.

A device for regulating transmitted power according to the invention thus provides an extremely flexible connection of the two grids so that load variations of short duration in the two grids will be combined and compensated for jointly by all the frequency regulating power stations connected to the two grids. The advantages are particularly noticeable when a load increase occurs in one grid at the same time as a load decrease occurs in the other. A link regulated according to the invention will thus cause an alteration of the transmitted power so that the power balance in *both* grids tends to be regained thus decreasing the regulating work of the frequency regulating power stations.

In the following the invention will be described more in detail with reference to the drawing where FIGURE 1 shows a block diagram of two alternating current grids connected together by means of an asynchronous link, which link can be controlled by a regulating device according to the invention. FIGURE 2 shows a link and control device according to FIGURE 1 in more detail, and FIGURES 3 and 4 show examples of details in the control equipment.

In FIGURE 1, 1 and 2 designate two alternating current grids connected together by means of an asynchronous link consisting of the converters 7 and 8. A load 3, here represented by the symbol for a transformer, and a generator 4, are connected to the grid 1. In the same way a load 5 and a generator 6 are connected to the grid 2. The generator 4 generates an alternating current having the frequency $f_1$ and the generator 6 an alternating current having the frequency $f_2$. At least one, 7, of the two converters 7 and 8, which may consist of rectifiers or other devices, is controlled by a regulating device 9. However, the other converter 8 may also be controlled by this regulating device as indicated by the broken line between the regulating device and the converter 8. The frequencies $f_1$ and $f_2$ of the two grids 1 and 2 are supplied to the device 9, for example directly via conductors from each grid, and the device is arranged to regulate the transmitted power dependent upon a time operand of the relative frequency difference between the two frequencies. If the converters are situated far from each other it may be more advantageous to transfer one of the frequencies in a manner known per se, for example by radio link or by means of carrier-frequency over the connecting direct current link. A power measuring device 10 may be arranged between the two converters or between one of these and one of the grids, to measure the power transferred. The regulating equipment may then also be under the influence of a signal being a time operand of the transmitted power so that a desired average transmitted power may be obtained over a longer transmission period. By measuring the transmitted power P with the aid of the measuring device 10 and allowing the regulating equipment to be influenced by for example the integral of the value measured, the average power can be maintained at a certain value for a longer period of time, for example one hour or 24 hours, despite the momentary value of the transmitted power showing great variations during the given period. With such an arrangement a load alteration, if it continues for a longer period, will cause the signal which is a time operand of the transmission power to intervene and restore the power exchange to a value which ensures a desired average transmission power. Thus in the long run load alterations are taken up by the generator stations connected to that grid to which the load causing the load alteration is connected.

FIGURE 2 shows in principle a converter according to FIGURE 1 together with a regulating device according to the invention. The two grids 1 and 2 are as before connected each to its own generator 4 and 6 respectively and load 3 and 5 respectively. The shown arrangement is a direct current link for high voltage direct current, and only the converter 7 according to FIGURE 1 is shown in detail in FIGURE 2. In principle the converter 8 may be identical to the converter 7. In the figure the two grids are single-phase grids having the frequencies $f_1$ and $f_2$, but it is clear that the grids could also be three-phase grids, in which case the converters should also be three-phase. The grid 1 is shown schematically connected to the primary winding 12 of a transformer 11, the secondary winding 13 of which is provided with a centre-tap connected via a smoothing reactance 14 to the other converter 8. The end points of the secondary winding are connected to anodes 61 and 62 in anionic rectifier 15 which is also provided with a cathode 16 and grid electrodes 19 and 20. The ionic rectifier 15 is so controlled that the alternating current power from the grid 1 is rectified in the ionic rectifier and transmitted to the converter 8 via the above mentioned smoothing reactor 14 and earth, which forms the return conductor to the cathode 16 of the ionic rectifier. The cathode 16 of the ionic rectifier 15 is in FIGURE 2 connected to earth via the control windings of two measuring transductors 17 and 18 so that the current transmitted can be measured. The control grids 19 and 20 of the ionic rectifier 15 will receive a negative direct voltage from a direct voltage source 63, which direct voltage is of such magnitude that it effectively throttles the current pasage through the ionic rectifier. On this direct voltage are superimposed ignition pulses obtained from the control transformer 21, the secondary winding of which is connected by its end points to the two grid electrodes 19 and 20. The primary winding of the transformer is connected to a control pulse generator 24 which may consist, for example, of a transistor flip-flop circuit. The control pulse generator 24 is connected on the input side to an amplifier 28 via a transformer 25, the secondary winding 26 of which is connected in series with the connection between the amplifier 28 and the control pulse generator 24. The primary winding 27 is connected to the grid 1 having the frequency $f_1$. The input side of the amplifier 28 is supplied with a direct voltage which is amplified by the amplifier 28 and supplied to the control pulse generator 24 together with the alternating voltage superimposed via the transformer 25. The control pulse generator 24, which is suitably arranged to give control pulses when the voltage on its input side passes through zero, may thus be arranged in a manner known per se to phase-displace the control pulses in relation to $f_1$ and dependent upon the magnitude of the direct voltage supplied. In accordance with the invention the converter, and therewith the transmitter power of the link, is influenced by a signal which is a time operand of the relative frequency difference of the two grids. In the shown arrangement this influence is obtained by supplying the frequencies $f_1$ and $f_2$ to a frequency comparing means 35 via input terminals $a$ and $b$, whereby the frequency comparing means is arranged to deliver a direct voltage between the output terminals $c$ and $d$, which direct voltage is a time operand of the relative frequency difference of the two grids. This direct voltage is supplied to the input side of the amplifier 28 via a series resistor 31. The input side of the amplifier is provided with a load resistor 42, through which other control signal currents may be added to the relative frequency difference signal discussed above.

According to a further development of the invention the regulating equipment may also be arranged to be influenced by a signal which is a time operand of the transmission power. For this purpose the regulating equipment is provided with a measuring transductor 18 connected between the cathode 16 of the ionic rectifier 15 and earth. The operating winding of the measuring transductor 18 is in series with a rectifier bridge 36, for example a Graetz bridge, connected to alternating current source. The output current of the rectifier bridge is converted across the resistor 37 to a voltage which forces a current through a Hall-generator 39 in series with a resistor 38. The Hall-generator 39 is also provided with a winding 40 which is connected in series with a resistor 60 between earth and the voltage carrying direct current connection between the ionic rectifier 15 and the converter 8. Due to the field generated by the winding 40 and the current through the resistor 38, a voltage is received from the Hall-generator which is a measurement of the transmitted power. The voltage obtained from the Hall-generator is compared with a voltage which can be set on the potentiometer 33 connected to a direct voltage source 34. The voltage between the movable arm 32 of the potentiometer 33 and earth in this case forms a reference for the desired transmission power. If the transmitted power does not correspond to that set with the aid of the potentiometer 33, the voltage obtained at the connection point between the resistor 29 and the resistor 30 will force a current through the resistor 42 so that the order obtained from the frequency comparing means 35 is modified.

As is apparent from the figure, the time integral of the deviations in transmission power from a certain desired value may also be obtained by means of a capacitor 67 connected across the resistor 58 to the Hall-generator and across the resistor 59 to the potentiometer 33. The voltage across the capacitor 67 then forces a current through the resistor 57 which is added to the other control currents through the resistor 42.

As illustrated on the drawing, a regulating device according to the invention may also be provided with a power limiting device which has the object of limiting the power transmitted to a value which is not dangerous for the converters. With ionic rectifiers it is in the first place the transmission current which must be limited to a definite highest value. A measuring transductor 17 is thus arranged to measure the transmission current in a similar way to the measuring transductor 18 by arranging the control winding of the transductor 17 between the cathode 16 of the ionic rectifier 15 and earth. The control winding of the transductor is in series with a rectifier bridge 43 connected to an alternating voltage source. From the rectifier bridge 43 a current is obtained which by means of the resistor 44 is converted into a voltage. The resistor 44 is connected in series with a second resistor 45 to which a direct voltage source is connected in such a way that the voltage across the resistor 45 is opposed to that across the resistor 44. The voltage of the voltage source 46 is set so that at the maximum permitted load current through the ionic rectifier 15, the voltage appearing across the resistor 44 causes the voltage in the seires connected resistor 47 to be less negative than the voltage at the input of the amplifier 28, and the valve 48 is thus opened. The signal from the limiting device is arranged to dominate over the power signal from the resistor 29 and the resistor 30 so that an increase in transmission power cannot take place.

The frequency comparing means 35 may be given many different forms, for example as illustrated in FIGURES 3 and 4. The frequency comparing means 35 according to these figures consists of two synchronous motors 49 and 50, each connected to its own direct current generator 51 and 52 respectively. The two direct current generators generate direct voltages which oppose each other, and these are suitably given such a magnitude that they compensate each other when the relative frequency difference is zero. The resultant direct voltage may be supplied via the connection points $c$ and $d$ to the input of the amplifier directly via a resistor 31 as illustrated in FIGURE 3, or an integrating device may be arranged between the direct current generators and the resistors as indicated in FIGURE 4. The integrating device consists of a load resistor 53, a series resistor 54 and a capacitor 55, across which the time integral of the difference between the voltages $e_1$ and $e_2$ is obtained. The transmission power will thus be influenced by the time integral of the relative frequency difference between the two grids.

The embodiments of a control device according to the invention shown in the drawing are intended only to illustrate in principle the method of operation of the invention and many other embodiments may be imagined within its scope. For example the regulating device may be arranged to regulate on only the relative frequency difference between the two grids by omitting the average power regulation which is supplied to the input of the amplifier via the resistor 57, and the instantaneous power regulation which is supplied to the input of the amplifier via the connection 56. The control equipment may also be arranged besides on the relative frequency, to regulate on either the desired average power or instantaneous power by omitting the equipment for power regulation and average power regulation respectively. Similarly other power measuring means could be used instead of the shown Hall-generator and the measuring transductors 17 and 18 could be replaced by other sensing elements. Neither is the invention limited to the shown method of generating control pulses for the ionic rectifier nor to the shown method of phase displacing these control pulses.

What is claimed is:

1. Device for regulating the transmitted power between two electric alternating current grids, which grids each contain loading objects and power generators which determine the frequency of the grid, and which grids are connected together via a link which permits the frequencies of the grids to be varied independently of each other which link contains one converter connected to one of the grids and one connected to the other, characterized in that at least one of the converters is equipped with a regulator which influences the transmitting power of the converter and therewith that of the link, which regulator is under the influence of a signal which is a time operand of the relative difference in frequency between the two grids, the regulator being also under the influence of another signal which is a time operand of the deviation of the transmitted power from certain previously defined power.

2. Device for regulating according to claim 1, characterised in that the second signal is a function of the deviation of the transmitted power from certain previously defined power.

3. Device for regulating according to claim 1, characterised in that the second signal is a function of the time integral of the deviation of the transmitted power from certain previously defined average power.

4. Device for regulating the transmitted power between two electric alternating current grids, which grids each contain loading objects and power generators which determine the frequency of the grid, and which grids are connected together via a link which permits the frequencies of the grids to be varied independently of each other (asynchronous operation), which link contains one converter connected to one of the grids and one connected to the other, characterised in that at least one of the converters is equipped with a regulator which influences the transmitting power of the converter and therewith that of the link, which regulator is under the influence of a signal which is a time operand of the relative difference in frequency between the two grids, the signal being a function of the time integral of the relative frequency difference of the two grids.

References Cited by the Examiner

UNITED STATES PATENTS

| | | | |
|---|---|---|---|
| 1,667,672 | 4/1928 | Nixdorff | 321—4 |
| 2,208,183 | 7/1940 | Alexanderson | 321—2 |
| 2,407,072 | 9/1946 | Gittings | 321—4 |
| 2,419,466 | 4/1947 | Willis | 321—4 |
| 2,435,187 | 2/1948 | Bedford | 321—4 |

ORIS L. RADER, *Primary Examiner.*

T. J. MADDEN, *Assistant Examiner.*